(12) United States Patent
Torres

(10) Patent No.: US 10,215,406 B1
(45) Date of Patent: Feb. 26, 2019

(54) FLUE GAS COMBUSTION APPARATUS

(71) Applicant: Randoplh Torres, Pittsburg, CA (US)

(72) Inventor: Randoplh Torres, Pittsburg, CA (US)

( * ) Notice: Subject to any disclaimer, the term of this patent is extended or adjusted under 35 U.S.C. 154(b) by 465 days.

(21) Appl. No.: 15/150,101

(22) Filed: May 9, 2016

(51) Int. Cl.
*F23G 7/06* (2006.01)
*F23G 5/46* (2006.01)

(52) U.S. Cl.
CPC ............. *F23G 7/06* (2013.01); *F23G 5/46* (2013.01); *F23G 2209/14* (2013.01)

(58) Field of Classification Search
CPC ............. F23G 7/06; F23G 2209/14; F23G 2900/50213
See application file for complete search history.

(56) References Cited

U.S. PATENT DOCUMENTS

| | | |
|---|---|---|
| 3,302,683 A | 2/1967 | Kemp |
| 4,030,877 A | 6/1977 | Robinson |
| 4,090,558 A * | 5/1978 | Akama .......... F23L 15/04 165/135 |
| 4,392,610 A | 7/1983 | Moskal |
| 4,449,511 A | 5/1984 | Hays et al. |
| 4,558,689 A | 12/1985 | McCann |
| 4,981,111 A | 1/1991 | Bennett et al. |
| 5,660,148 A | 8/1997 | Raiko |

* cited by examiner

*Primary Examiner* — David J Laux
(74) *Attorney, Agent, or Firm* — Joe D. Calhoun

(57) ABSTRACT

A flue gas combustion apparatus for processing uncombusted flue gas components utilizing a reactor body. The reactor body houses first and second spiral passageways for motivating flue gas and ambient air, respectively, in a counter-current pattern. Heated ambient air feeds the flue gas in the reactor.

10 Claims, 2 Drawing Sheets

FLUE GAS COMBUSTION APPARATUS

BACKGROUND OF THE INVENTION

The present application relates to a novel and useful flue gas combustion apparatus.

Flue gasses generally emanate to the atmosphere via a flue or stack from fireplace, oven, furnace, boiler, steam generator, or the like. Flue gas is also often referred to as the combustion exhaust gases produced at a power plant. Flue gas exiting burning units consists mostly of nitrogen, carbon dioxide, and water vapor. However, a notable percentage of unburned hydrocarbons also exit flues.

In the past, flue gas combustion recovery devices have been proposed to recycle particulate matter and to insure energy capture therefrom.

For example, U.S. Pat. Nos. 4,030,877, 4,449,511, and 4,558,689 describe waste gas heat recovery devices in which one or more heat exchangers are placed in the path of exhaust flue gases from a furnace to extract heat therefrom.

U.S. Pat. No. 4,981,111 shows a combustion unit in which exhaust fly ash is recovered according to particle size and where certain particles are used to control the temperature of the combustion zone of the reactor.

U.S. Pat. No. 4,392,610 shows a heat scavenger system in which the incoming air to a furnace is preheated by a heat exchanger which is connected to the exhaust flue of the furnace.

U.S. Pat. No. 5,660,148 shows a method for cooling the circulating material in a fluidized bed boiler which uses a heat exchanger to remove heat from the flue gas and recycle the cooled flue gases to the combustion chamber.

U.S. Pat. No. 3,302,683 shows a heat treatment apparatus in which incoming air to a burner cone is preheated by the use of an extraction cone. The incoming air and the exhaust air from the extraction cone pass against each other through a spiral heat exchanger.

A flue gas combustion apparatus which recovers heat and energy from a burning unit would be a notable advance in the energy production arts.

SUMMARY OF THE INVENTION

In accordance with the present application, a novel and useful flue gas combustion apparatus is herein described.

The apparatus of the present application includes a reactor body having a first end portion, an opposite second end portion, and an intermediate portion therebetween. A first spiral passageway for conducting flue gas extends from an entrance at the first end portion of the reactor body, through the intermediate portion of the reactor body, and exits at the second end portion of the reactor body.

The reactor body further comprises a second spiral passageway for conducting ambient air. The second spiral passageway possesses an entrance at the second portion of the reactor body and an exit at the first portion of the reactor body. Thus, the first and second spiral passageways move counter-currently.

The reactor body may include a refractory body housing the first spiral passageway. Also, a conduit may be mounted adjacent the refractory body and include the second spiral passageway. The first and second spiral passageway, in any case, would be positioned adjacent to one another to permit heat transfer between the first and second spiral passageways.

The reactor body also includes a shaft, plenum, or manifold which is centrally located within the first spiral passageway. At least one aperture is included for communicating air in the shaft to the first spiral passageway in the reactor body.

It may be apparent that a novel and useful flue gas combustion apparatus has hereinabove been described.

It is therefore an object of the present application to provide a flue gas combustion apparatus that is unitary in construction and permits the preheating of ambient air for secondary combustion of flue gas components exiting a burning unit.

Another object of the present application is to provide a flue gas combustion apparatus that possesses a minimum number of moving parts.

Another object of the present application is to provide a flue gas combustion apparatus which may be retrofitted to a burning unit to recover heat from secondary combustion of the flue gas components exiting the burning unit.

Another object of the present application is to provide a flue gas combustion apparatus which utilizes counter-current flow to allow heat exchange between relatively cool ambient air and hot flue gases.

Yet another object of the present application is to provide a flue gas combustion apparatus that recovers energy from unburned hydrocarbons exiting a burning unit and uses the same for secondary useful processing.

The invention possesses other objects and advantages especially as concerns particular characteristics and features thereof which will become apparent as the specification continues.

Figure 1:
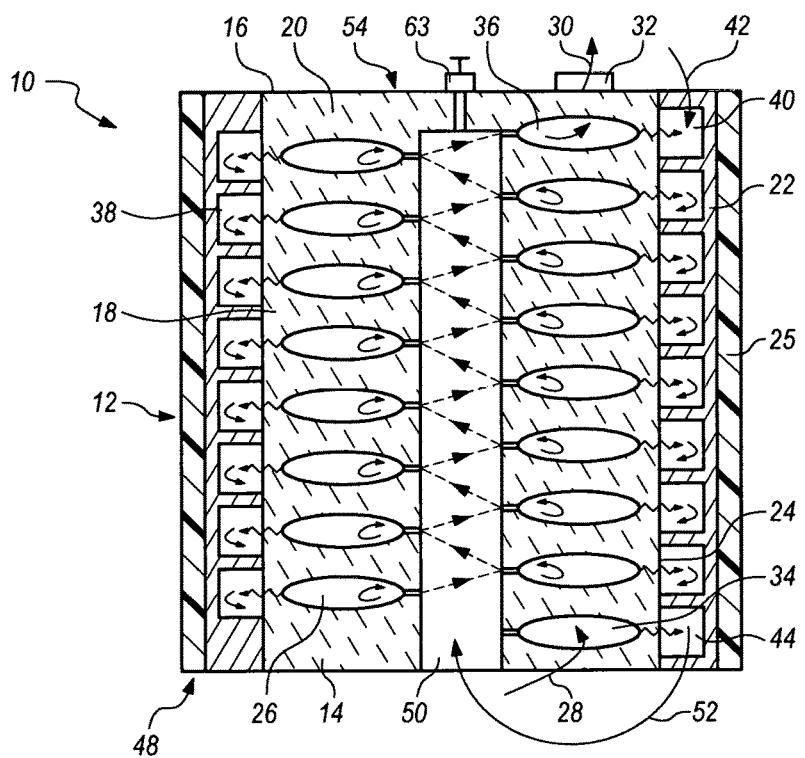
FIG. 1 is a sectional view of the reactor body of the present application.

For a better understanding of the invention, reference is made to the following detailed description of the preferred embodiments thereof which should be referenced to the prior described drawings.

DETAILED DESCRIPTION OF THE PREFERRED EMBODIMENTS

Various aspects of the present application will evolve from the following detailed description of the preferred embodiments, which should be referenced to the prior delineated drawings.

The apparatus as a whole is depicted in the drawings by reference character 10. Apparatus 10 includes a reactor body 12, which is shown as being cylindrical in shape, FIG. 4. Reactor body 12 includes a first portion 14, a second portion 16, and an intermediate portion 18. Reactor body 12 is also formed with a refractory body 20, which may be constructed of a ceramic or similar material. In addition, a conduit 22 lies adjacent refractory body 20 and essentially wraps around the outer surface or wall 24 thereof. Insulation layer 25 overlies conduit 22.

A first spiral passageway 26 extends from first portion 14, through intermediate portion 18, and to second portion 16 of reactor body 12. Spiral passageway 26 is intended to carry and combust flue gas. Directional arrow 28 indicates the entrance to spiral passageway 26 for flue gas. Likewise, directional arrow 30 shows the exiting of flue gas from spiral passageway 26 through a stack 32. Consequently, openings 34 and 36 of spiral passageway 26 mark the entrance and exit, respectively, to first spiral passageway 26.

Conduit 22 also serves to enclose a second spiral passageway 38, which serves to conduct ambient air through entrance 40, directional arrow 42, and out through exit 44, directional arrow 46. It should be noted that first spiral passageway 26 is in sufficient proximity to second spiral passageway 38 to allow heat transfer from first spiral passageway 26 to second spiral passageway 38. Such heat transfer is indicated by plurality of jagged arrows 48, FIGS. 1 and 2. Such heat transfer takes place chiefly by conduction through and radiation from refractory body 20.

It should be further apparent that reactor body 12 includes a central shaft, plenam, or manifold 50, which communicates with the exit 44 of second spiral passageway 38 through a channel of conventional configuration (not shown). Directional arrow 52 indicates such movement of heated ambient air from second spiral passageway 38 to central shaft 50, which lies inside first spiral passageway 26.

Figure 2:
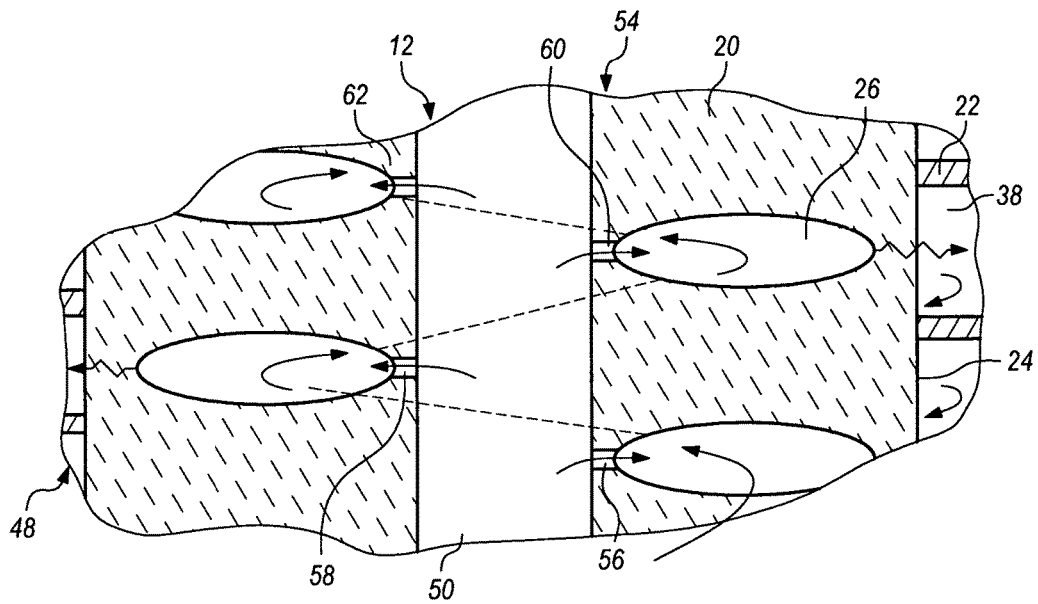
FIG. 2 is a sectional view of a portion of the reactor body of FIG. 1.

A plurality of apertures 54 connect first spiral passageway 26 with shaft 50. Such plurality of apertures 54 are best shown in FIG. 2 as apertures 56 *a*, 58, 60, and 62. Thus, heated air in central shaft 50 will pass through plurality of apertures 54 into first spiral passageway 26. Such movement would be motivated by the travelling of flue gas through first spiral passageway 26 and the sizing of plurality of apertures 48. An exit valve 63 may be employed to balance and/or initiate the flow of heated air through plurality of apertures 54 to first spiral passageway 38. In addition, a separate valve, such as a butterfly valve, may be employed to regulate the inflow of air to conduit 22 at entrance 40.

Figure 3:
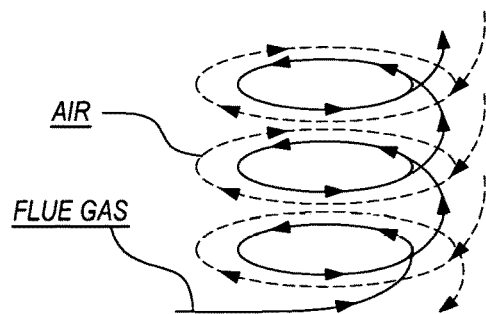
FIG. 3 is a schematic drawing emphasizing the spiral paths of the first and second spiral passageways of the reactor body of FIGS. 1 and 2.

FIG. 3 schematically represents the countercurrent travelling of ambient air through second passageway 38, shown by dashed lines, and flue gas travelling through first spiral passageway 26, shown by solid lines. In this manner, heat is transferred between the relatively hot flue gas passing through first spiral passageway 26 to the ambient air moving countercurrently through second spiral passageway 38.

Figure 4:
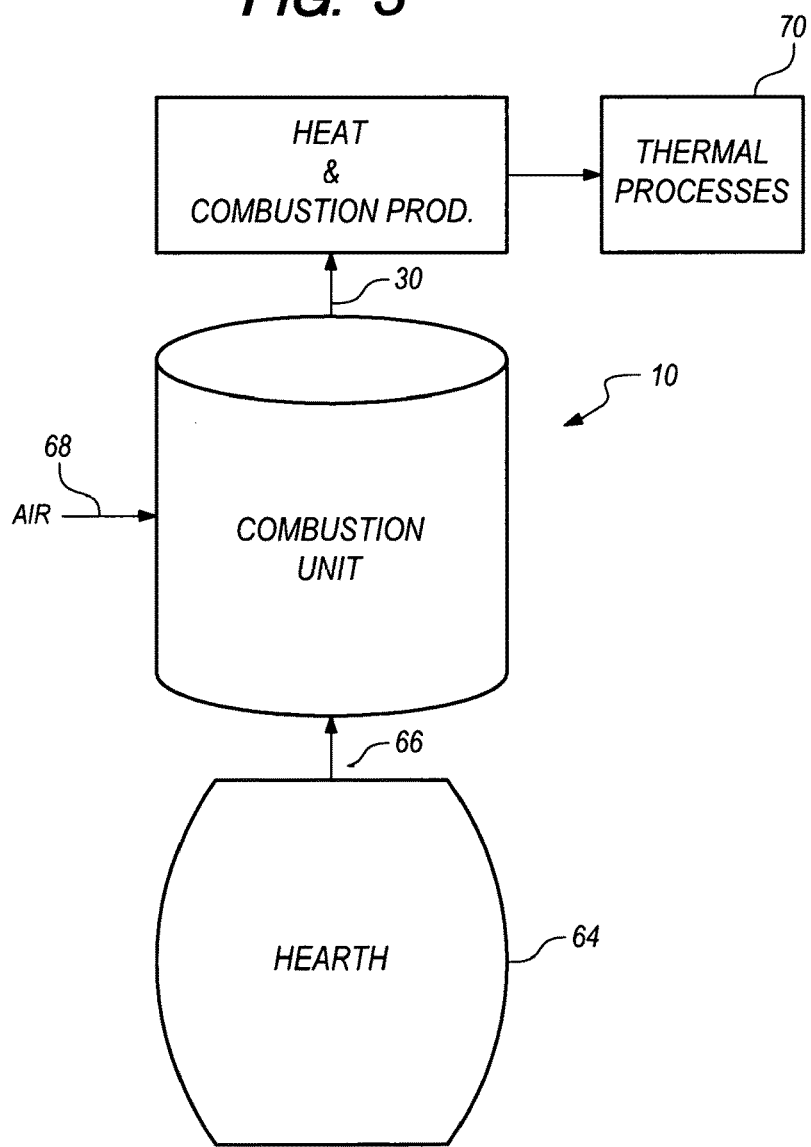
FIG. 4 is a block diagram indicating the positioning of the apparatus of the present application with a hearth or furnace.

In operation, apparatus 10 is placed above a hearth or furnace 64, FIG. 4 to receive flue gas therefrom. Flue gas 66 includes combustible material such as unburned hydrocarbons. Combustion unit 10 receives ambient air, directional arrow 68. Flue gas 66 is directed to the entrance 34 of first spiral passageway 26 of reactor body 12 and moves in a spiral direction, as indicated by FIG. 3, to exit 36. At the same time, ambient air is passed into second spiral passageway 38 through entrance 40 and moves in an opposite spiral direction, FIG. 3, to exit 44. Heat is exchanged between the flue gas passing through passageway 26 to the ambient air travelling through second spiral passageway 38, via refractory body 20, jagged arrows 48. At this juncture, the heated ambient air is directed to central shaft 50, directional arrow 52. Heated ambient air is then fed into first spiral passageway 26 through plurality of apertures 54 to aid in the further combustion of hot flue gas within first spiral passageway 26. In other words, such combustion takes place in first spiral passageway 26 as the flue gas travels between entrance 34 and exit 36. A flame source may be added to insure such combustion but the heat of the flue gas entering first spiral passageway is generally sufficient for combustion. Flue gas exiting combustion unit apparatus 10 is then gathered from stack 32 and used for further thermal processing 70, such as heating a space, operating a turbine, and to fulfill any other thermal work.

While in the foregoing embodiments of the invention have been set forth in considerable detail for the purposes of making a complete disclosure of the invention it may be apparent to those of skill in the art that numerous changes may be made in such details without departing from the spirit and principles of the invention.

What is claimed is:

1. A flue gas combustion apparatus receiving flue gas from a burning unit and ambient air, comprising:
 a reactor body having a first end portion, an opposite second end position, and an intermediate portion therebetween, said refractory body further comprising a first spiral passageway for conducting the flue gas, said first spiral passageway having an entrance at said first portion and an exit at said second portion, said first spiral passageway extending through said intermediate portion of said reactor body between said first and second portions of said reactor body;
 said reactor body further comprising a second spiral passageway for conducting ambient air, said second spiral passageway having an entrance at said second portion and an exit at said first portion;
 said reactor body further comprising a shaft, said shaft lying within said first spiral passageway, said exit of said second spiral passageway feeding said shaft; and
 at least one aperture communicating said shaft with said first spiral passageway, to pass air for combustion of the flue gas therein.

2. The apparatus of claim 1 in which said first spiral passageway positions adjacent said second spiral passageway at a certain distance to permit heat transfer between said first and second spiral passageways.

3. The apparatus of claim 1 in which said reactor body includes a refractory body.

4. The apparatus of claim 3 in which said refractory body comprises a ceramic refractory body.

5. The apparatus of claim 3 in which said first spiral passageway lies within said refractory body.

6. The apparatus of claim 5 in which said refractory body comprises a ceramic refractory body.

7. The apparatus of claim 5 in which reactor body further includes a conduit mounted adjacent said refractory body, said second spiral passageway lying within said conduit.

8. The apparatus of claim 7 which additionally comprises an insulation layer at least partially surrounding said conduit.

9. The apparatus of claim 8 in which said first spiral passageway positions adjacent said second spiral passageway at a certain distance to permit heat transfer between said first and second spiral passageways.

10. The apparatus of claim 9 in which said refractory body comprises a ceramic refractory body.

\* \* \* \* \*